(12) United States Patent
Li et al.

(10) Patent No.: US 10,410,103 B2
(45) Date of Patent: Sep. 10, 2019

(54) TWO-DIMENSIONAL DOT MATRIX BARCODE ENCODING AND IDENTIFYING METHODS

(71) Applicant: SHENZHEN MPR TECHNOLOGY CO., LTD, Shenzhen, Guangdong (CN)

(72) Inventors: Zhengfang Li, Guangdong (CN); Zhiguo Chang, Guangdong (CN)

(73) Assignee: SHENZHEN MPR TECHNOLOGY CO., LTD, Shenzhen, Guangdong (CN)

( * ) Notice: Subject to any disclaimer, the term of this patent is extended or adjusted under 35 U.S.C. 154(b) by 0 days.

(21) Appl. No.: 16/055,137

(22) Filed: Aug. 5, 2018

(65) Prior Publication Data

US 2018/0341844 A1    Nov. 29, 2018

Related U.S. Application Data

(63) Continuation of application No. PCT/CN2017/072162, filed on Jan. 23, 2017.

(30) Foreign Application Priority Data

Feb. 6, 2016  (CN) .......................... 2016 1 0083896

(51) Int. Cl.
   *G06K 19/06*  (2006.01)
   *G06K 7/14*  (2006.01)

(52) U.S. Cl.
   CPC ..... *G06K 19/06037* (2013.01); *G06K 7/1417* (2013.01); *G06K 19/06046* (2013.01)

(58) Field of Classification Search
   USPC ................................................. 235/494, 492
   See application file for complete search history.

(56) References Cited

U.S. PATENT DOCUMENTS

| | | |
|---|---|---|
| 2009/0184171 A1 | 7/2009 | Lv |
| 2009/0200386 A1 | 8/2009 | Longacre |
| 2009/0302114 A1 | 12/2009 | Ao |
| 2012/0298761 A1 | 11/2012 | Lin |

(Continued)

FOREIGN PATENT DOCUMENTS

| | | |
|---|---|---|
| CN | 1963843 | 5/2007 |
| CN | 102214312 A | 10/2011 |

(Continued)

*Primary Examiner* — Allyson N Trail
(74) *Attorney, Agent, or Firm* — Winston Hsu

(57) ABSTRACT

A two-dimensional dot matrix barcode encoding method comprises: forming a plurality of coordinate calibration blocks, a plurality of data storage blocks, a first indication block and a second indication block respectively by filling code points into the virtual code point storage blocks, wherein the first indication block and the plurality of coordinate calibration blocks are filled with a code point located in the center of the virtual code point storage blocks; and forming, by means of a combination of the first indication block and the second indication block, a direction and coordinate indication set indicative of a direction and a coordinate, wherein the second indication block is not filled with a code point or is filled, in the center thereof, with an ink code point capable of reflecting a light having a specific wavelength, and the plurality of coordinate calibration blocks are separated from each other.

10 Claims, 34 Drawing Sheets

(56) References Cited

U.S. PATENT DOCUMENTS

| | | | | |
|---|---|---|---|---|
| 2013/0026241 | A1* | 1/2013 | Sakahashi | G06K 19/06037 |
| | | | | 235/494 |
| 2013/0201870 | A1* | 8/2013 | Gupta | H04W 4/70 |
| | | | | 370/254 |
| 2015/0324946 | A1* | 11/2015 | Arce | G06T 1/0021 |
| | | | | 382/251 |
| 2016/0283763 | A1* | 9/2016 | Hosokane | G06K 19/06037 |
| 2018/0365459 | A1* | 12/2018 | Barnum | G06K 19/06037 |

FOREIGN PATENT DOCUMENTS

| | | |
|---|---|---|
| CN | 102622599 | 8/2012 |
| CN | 104143109 | 11/2014 |
| CN | 105760919 | 7/2016 |
| EP | 2849115 A1 | 3/2015 |

\* cited by examiner

TWO-DIMENSIONAL DOT MATRIX BARCODE ENCODING AND IDENTIFYING METHODS

CROSS REFERENCE TO RELATED APPLICATIONS

This application is a continuation application of PCT/CN2017/072162, filed on Jan. 23, 2017. The contents of the above-mentioned application are all hereby incorporated by reference.

BACKGROUND OF THE INVENTION

1. Field of the Invention

The present invention relates to the technical field of image identification, and more particularly relates to two-dimensional dot matrix barcode encoding and identifying methods.

2. Description of the Prior Art

People read traditional books, newspapers, etc. mainly with eyes. This way of acquiring information is boring, and easily causes visual fatigue over time. Moreover, blind people or people with eye diseases cannot read this traditional publication. To this end, voice reading publications have appeared in recent years, such as the Chinese invention patent with the patent number ZL200610156879.4. For a Multimedia Print Reader (MPR) publication, a two-dimensional barcode voice reading device can be used to decode the content of the voice reading publication to allow a reader to receive audio and video content while reading, which improves the efficiency of reading or memory, and is more convenient for children or those people with visual disability or hearing disability to learn. For an MPR two-dimensional barcode, please see the MPR publication industry standards, including MPR publication Part 1 (Symbology Specification of MPR Code, Standard Number: CY/T58.1-2009), Part 2 (Encoding Rule of MPR Code, Standard Number: CY/T58.2-2009), Part 3 (General Rules of Production, Standard Number: CY/T58.3-2009), Part 4 (Requirements and Inspecting Methods for MPR Code Printing Quality, Standard Number: CY/T58.4-2009), and Part 5 (Basic Management Rules, Standard Number: CY/T58.5-2009).

FIG. 1 is an application schematic diagram of a dot matrix code. The graph-text 101 (such as a pattern "cock" in FIG. 1) and a dot matrix code 102 are printed on a surface 100 of an object such as paper, and 103 is an electronic device having functions of optical image acquisition and identification. When the electronic device 103 approaches the dot matrix code 102, the electronic device 103 identifies index data stored in the dot matrix code 102, and the electronic device 103 sends the index data to a media playing component (built in the electronic device 103 or independently of the electronic device 103) by wire or wirelessly, and the media playing component retrieves and plays the digital media content (e.g., "cock crow") associated with the graph-text 101 according to the index data. This application is widely used in audio books for young children. With the rapid development of mobile Internet technology, the need for associating all-media content including graphs, texts, audios and videos on the Internet with paper-based textbooks is becoming more and more urgent. For example, online lecture videos of a teacher are associated with paper-based textbooks of students, and the students touch the knowledge point content of the textbooks by electronic device 103 in wireless or wired connection to a video player to trigger the video player to play the lecture videos of the teacher associated with the knowledge point content. There are massive resources on the internet, so each associated digital media content must have a unique ID code. If the same ID code is reused, the associated digital media content will be separated into a plurality of independent systems, and content consumers will need to use different reading pens for each independent system. This is a major drawback of the current technical products in the present field. In order to solve this problem, the encoding capacity of a two-dimensional dot matrix barcode must be increased. There are two methods to increase the encoding capacity. The first method is to increase the printing density of code points under the premise of keeping the area of a single two-dimensional dot matrix barcode unchanged, but this will increase the visual interference of the code points on a graph-text, so that the graph-text looks much darker than that by normal printing. The second method is to keep code point spacing constant and increase the area of a single two-dimensional dot matrix barcode, but this will significantly increase the operation amount of image identification and the error rate of code point coordinate positioning.

As shown in FIG. 2, a first known dot matrix code is composed of a first code point group 210 and a second code point group 211 having a data storage function. Since an optical imaging system has a perspective distortion, code points in the second code point group 211 are further away from code points in the first code point group 210 after rows and columns are enlarged, and a center coordinate error of a mesh in the second code point group 211 recovered according to a code point coordinate in the first code point group 210 will also become larger and larger.

As shown in FIG. 3, a second known dot matrix code is an improved version of the dot matrix code shown in FIG. 2. A code point has up to 8 deviation states to store 3 bits of data. On the premise of the same number of rows and columns, the dot matrix code shown in FIG. 3 and the dot matrix code shown in FIG. 2 have the same storage capacity, and code points having a coordinate calibration function in FIG. 3 are relatively evenly distributed in a matrix, but an effect that at least one coordinate calibration code point is adjacent to each data storage code point is not achieved.

In summary, a code point configuration form in the prior art cannot be well applied to a large encoding capacity, so it is greatly challenging for engineers and technicians in the field to design a two-dimensional dot matrix barcode encoding method which is large in encoding capacity, adapts to a large optical imaging distortion, has a small visual interference to human eyes and can be simply and reliably identified, and corresponding identification and decoding algorithms.

The above disclosure of the background art is only for assisting in understanding the inventive concept and technical solution of the present invention, and does not necessarily belong to the prior art of the present patent application, and if there is no clear evidence showing that the above content has been disclosed on the filing date of the present patent application, the above background art should not be used to evaluate the novelty and inventiveness of the present application.

SUMMARY OF THE INVENTION

An objective of the present invention is to provide two-dimensional dot matrix barcode encoding and identifying methods, intended to solve the technical problems in the prior art of increased operation amount of identification and high error rate of code point positioning caused by the increase of an encoding capacity due to uneven distribution of coordinate calibration code points.

To this end, the present invention provides a two-dimensional dot matrix barcode encoding method, a two-dimensional dot matrix barcode being composed of M×N virtual code point storage blocks, the method including: forming a plurality of coordinate calibration blocks, a plurality of data storage blocks, a first indication block and a second indication block by filling code points into the virtual code point storage blocks respectively, wherein code points filled in the plurality of coordinate calibration blocks are located in the centers of the virtual code point storage blocks; a code point filled in the first indication block is located in the center thereof, and the second indication block is not filled with a code point or is filled, in the center thereof, with an ink code point capable of reflecting a light having a specific wavelength; a direction and coordinate indication set indicative of a direction and a coordinate is formed by means of a combination of the first indication block and the second indication block; the plurality of coordinate calibration blocks are separated from each other and distributed among the two-dimensional dot matrix barcode; code points filled in the plurality of data storage blocks are used to store data information, and the code points filled in the plurality of data storage blocks are disposed away from the center of the virtual code point storage block; and the plurality of coordinate calibration blocks and the plurality of data storage blocks have only one code point, where M≥4, N≥4, and M and N are both even numbers.

According to an embodiment, the encoding method may have the following technical features: In the two-dimensional dot matrix barcode, the virtual code point storage blocks in which row coordinates and column coordinates are both odd or even are coordinate calibration blocks, and the remaining virtual code point storage blocks are the first indication block, the second indication block and the data storage blocks.

The plurality of coordinate calibration blocks, the plurality of data storage blocks, a first indication block and a second indication block are divided into 3×3 sub-blocks by virtual row and column lines respectively, and a central sub-block of each coordinate calibration block is filled with a code point; a central sub-block of the first indication block is filled with a code point; the second indication block is not filled with a code point or a central sub-block is filled with an ink code point capable of reflecting a light having a specific wavelength; and only one sub-block in each data storage block is filled with a code point, a middle sub-block of the data storage block is not provided with a code point, and the data storage block stores different data by filling code points in different sub-blocks.

After the direction and coordinate indication set is rotated by ±90° or 180° around the geometric center of the second indication block, the first indication block does not overlap with that before rotation.

The present invention also provides a two-dimensional dot matrix barcode identifying method, used for identifying a two-dimensional dot matrix barcode obtained by using the method of any of the above, including the following steps of: acquiring a barcode grayscale image not smaller than the size of a two-dimensional dot matrix barcode, the grayscale image including at least one direction and coordinate indication set and a plurality of coordinate calibration blocks; acquiring row and column positions of the coordinate calibration blocks and the direction and coordinate indication set in the two-dimensional dot matrix barcode according to the grayscale image including the at least one direction and coordinate indication set and the plurality of coordinate calibration blocks; and reading data stored in the two-dimensional dot matrix barcode according to the grayscale image and the row and column positions of the coordinate calibration blocks and the direction and coordinate indication set.

According to an embodiment, the identifying method may also have the following technical features: Reading data stored in the two-dimensional dot matrix barcode includes the following steps of:

S1: performing binarization processing on the grayscale image to obtain a binary image, and marking a code point in the binary image to determine a barycentric coordinate (x, y) of the code point;

S2: determining a row direction and a column direction of the code point and row dividing points and column dividing points: determining the row direction and the column direction of the code point by taking the geometric center of the binary image as a rotation center and calculating a mean square error of a projection waveform of the barycentric coordinate of the code point in a predetermined direction at each rotation angle of the binary image, then projecting the barycentric coordinate (x, y) of the code point in the row direction and the column direction, and calculating the row dividing points and the column dividing points for the projection waveform by using an autocorrelation method;

S3: rotating and converting the barycentric coordinate (x, y) of the code point according to the row direction and the column direction obtained in step S2, calculating a converted code point coordinate $(x_1, y_1)$ after rotation, and forming, by using the row dividing points and the column dividing points obtained in step S2, a rectangular mesh for dividing the code points;

S4: constructing a two-dimensional matrix corresponding to the rectangular mesh obtained in step S3, determining, according to the converted code point coordinate $(x_1, y_1)$, a block in the rectangular mesh to which the converted code point coordinate belongs, and then adding the converted code point coordinate $(x_1, y_1)$ to a unit of the two-dimensional matrix corresponding to the block;

S5: identifying a rotation direction and an offset of the two-dimensional matrix according to the unit of the two-dimensional matrix in feature matching with the first indication block and the second indication block; and S6: reconstructing a complete two-dimensional dot matrix barcode according to the rotation direction and the offset, and reading data stored therein.

The rotation direction of the two-dimensional matrix is obtained according to a relative position between the first indication block and the second indication block.

Reading values stored in the data storage block according to the coordinate calibration block specifically includes: first, calculating a center coordinate of the data storage block according to the converted code point coordinate $(x_1, y_1)$ of the coordinate calibration block; and then, reading the stored data according to an offset of the converted code point coordinate $(x_1, y_1)$ of the code point stored in the data storage block relative to the center coordinate.

The center coordinate of the data storage block is calculated by using an interpolation method according to the converted code point coordinate $(x_1, y_1)$ of the coordinate calibration block.

Reconstructing a complete two-dimensional dot matrix barcode includes the following sub-steps:

S601: acquiring correct reference positions of the second indication block, the coordinate calibration block and the data storage block respectively;

S602: identifying units in feature matching with the second indication block, the coordinate calibration block and the data storage block in the two-dimensional matrix respectively, and determining relative positions of the units in feature matching with the coordinate calibration block and the data storage block by taking the unit in feature matching with the second indication block as a position origin;

S603: allowing the position origin to overlap with the correct reference position of the second indication block, and allowing the relative position of the unit in feature matching with the coordinate calibration block of the two-dimensional matrix to overlap with the correct reference position of the coordinate calibration block; and S604: decomposing the virtual code point storage blocks in the two-dimensional matrix with reference to the correct reference positions, and moving them to correct positions, so as to reconstruct a two-dimensional matrix that is the same as the two-dimensional dot matrix barcode in both row-column number and arrangement.

Compared with the prior art, the present invention includes the beneficial effects that: in the present invention, the coordinate calibration blocks are evenly distributed among the data storage blocks, and a direction indication block is composed of the first indication block and a second indication block, so that identification is more facilitated, the identification error is reduced, the identification speed is increased; meanwhile, the problems of printing and visual interference are solved and resistance to optical imaging deformation is improved. In addition, the present invention has the advantages of having a large encoding capacity and small interference to human vision, and being simple and reliable to identify.

In a preferred solution, after the direction and coordinate indication set is rotated by ±90° or 180° around the geometric center of the second indication block, the first indication block does not overlap with that before rotation, so that the rotation direction of an image can be accurately determined, and thus further technical effects of high identification speed and high accuracy are achieved.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
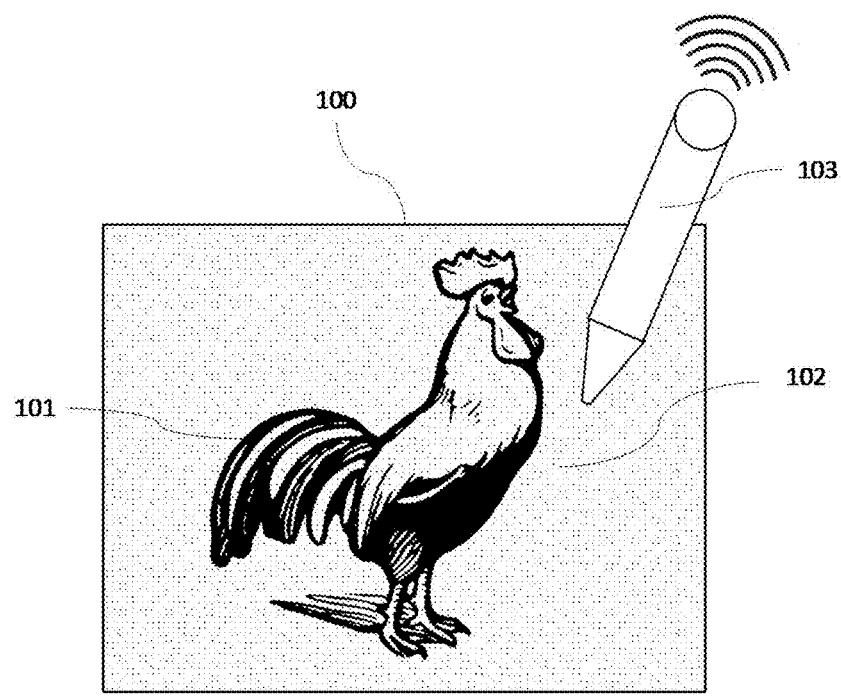
FIG. 1 is an application schematic diagram of a dot matrix code.
Figure 2:
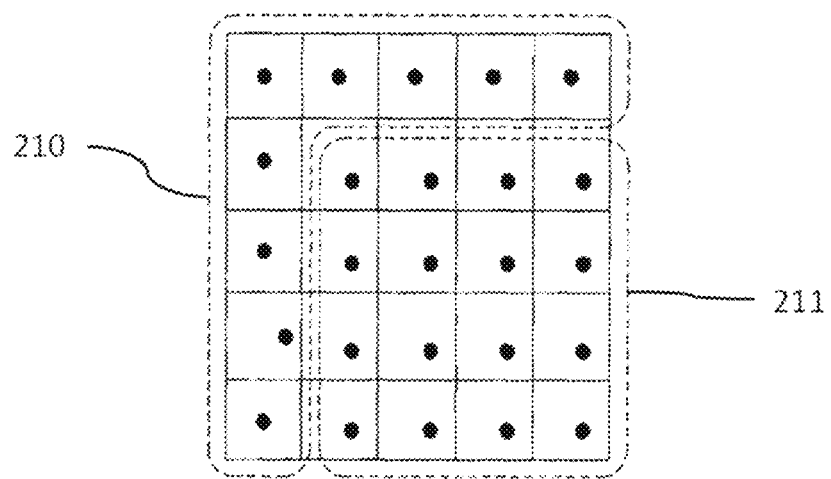
FIG. 2 is a schematic diagram of a first known dot matrix code.
Figure 3:
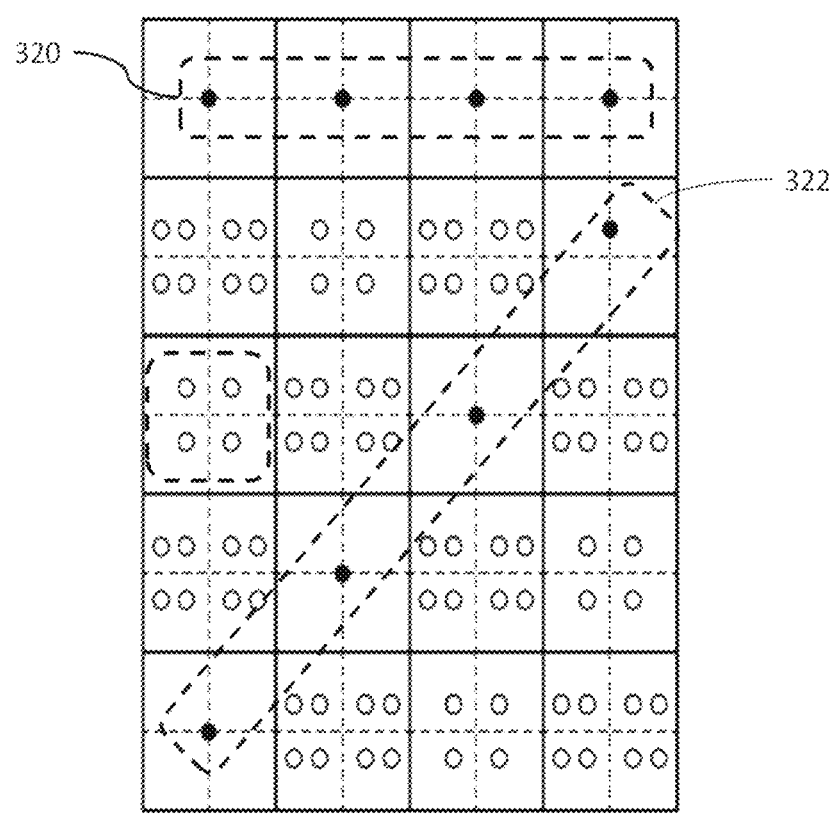
FIG. 3 is a schematic diagram of a second known dot matrix code.

The present invention will be further described in detail below in conjunction with the specific implementation modes and with reference to the accompanying drawings. It should be noted that the following description is only illustrative, and is not intended to limit the scope of the present invention and the application thereof.

Non-limitative and non-exclusive embodiments will be described with reference to FIG. 1 to FIG. 33, wherein the same reference numerals refer to the same parts unless otherwise specifically described.

Embodiment 1

As shown in FIG. 4 to FIG. 9, a two-dimensional dot matrix barcode encoding method is provided. A two-dimensional dot matrix barcode 701 is composed of 6×6 virtual code point storage blocks 400. Nine coordinate calibration blocks 720, 25 data storage blocks 730, a first indication block 7101 and a second indication block 7102 are formed by filling code points 500 into the virtual code point storage blocks 400 respectively.

Code points 500 filled in the coordinate calibration block 720 are located in the centers of the virtual code point storage block 400.

A direction and coordinate indication set 710 indicative of a direction and a coordinate is formed by means of a combination of the first indication block 7101 and the second indication block 7102, the second indication block 7102 is the virtual code point storage block 400 without the code point 500, and the first indication block 7101 is filled, in the center, with a code point.

The plurality of coordinate calibration blocks 720 are separated from each other and distributed among the two-dimensional dot matrix barcode 701.

The code points 500 filled in the plurality of data storage blocks 730 are used to store data information, and the code points 500 filled in the plurality of data storage blocks 730 are disposed away from the center of the virtual code point storage block 400.

The plurality of coordinate calibration blocks 720 and the plurality of data storage blocks 730 have only one code point 500, where M≥4, N≥4, and M and N are both even numbers.

Figure 8:
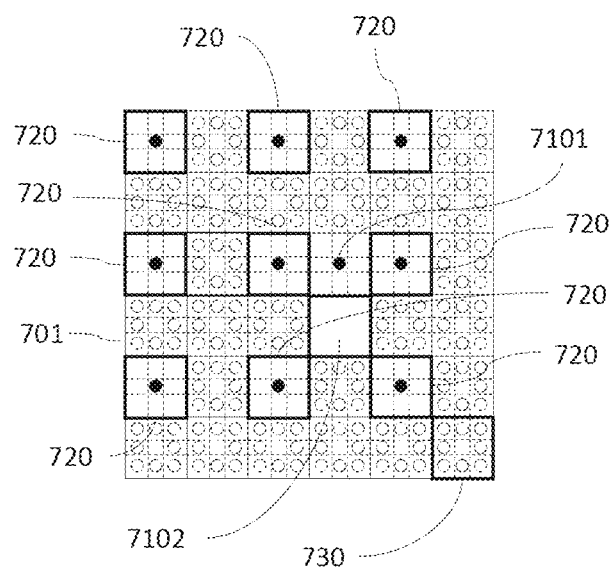
FIG. 8 is a schematic diagram of a 6×6 two-dimensional dot matrix barcode according to a specific implementation mode 1 of the present invention.

In the embodiment, in two-dimensional dot matrix barcode, the virtual code point storage blocks in which row coordinates and column coordinates are both odd are coordinate calibration blocks, and the remaining virtual code point storage blocks are the first indication block, the second indication block and the data storage blocks. As shown in FIG. 8, from top to bottom, the virtual code point storage block 400 in the sixth row of the two-dimensional dot matrix barcode 701 is the data storage block 730; from left to right, the virtual code point storage block 400 in the sixth column of the two-dimensional dot matrix barcode 701 is the data storage block 730; the virtual code point storage block 400 in the fourth row and the fourth column of the two-dimensional dot matrix barcode 701 is the second indication block 7102, and the virtual code point storage block 400 in the third row and the fourth column of the two-dimensional dot matrix barcode 701 is the first indication block 7101; except all the virtual code point storage blocks 400 in the sixth row of the two-dimensional dot matrix barcode 701, all the virtual code point storage blocks 400 in the sixth column, the first indication block 7101 and the second indication block 7102, the virtual code point storage block 400 of which the coordinates are an odd row and an odd column is the coordinate calibration block 720, and the remaining are the data storage blocks 730; the virtual code point storage block 400 of which the coordinates are an odd row and an even column is the data storage block 730, and the coordinate calibration blocks 720 are disposed at left and right parts adjacent to the data storage block 730 of which the coordinates are an odd row and an even column respectively; the virtual code point storage block 400 of which the coordinates are an even row and an odd column is the data storage block 730, and the coordinate calibration blocks 720 are disposed at upper and lower parts adjacent to the data storage block 730 of which the coordinates are an even row and an odd column respectively; and the virtual code point storage block 400 of which the coordinates are an even row and an even column is the data storage block 730, and the coordinate calibration blocks 720 are disposed at upper left, lower left, upper right and lower right parts adjacent to the data storage block 730 of which the coordinates are an even row and an even column respectively. It is understood by those skilled in the art that the embodiment shown in FIG. 8 may also be replaced with: in two-dimensional dot matrix barcode, the virtual code point storage blocks in which row coordinates and column coordinates are both even are coordinate calibration blocks, and the remaining virtual code point storage blocks are the first indication block, the second indication block and the data storage blocks. It is similar to the rotation of FIG. 8 by 180 degrees, and the technical effect of FIG. 8 can also be obtained.

Figure 4:
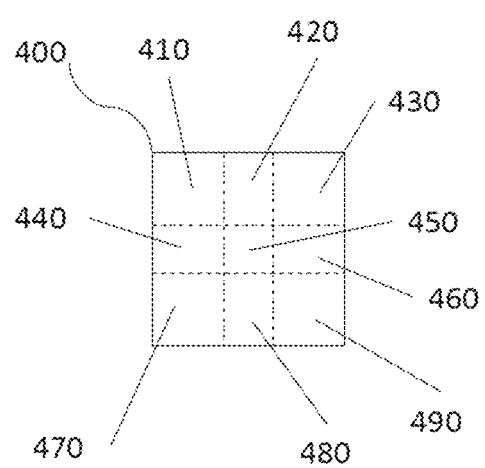
FIG. 4 is a schematic diagram of dividing a virtual code point storage block and a sub-block according to a specific implementation mode 1 of the present invention.
Figure 5:
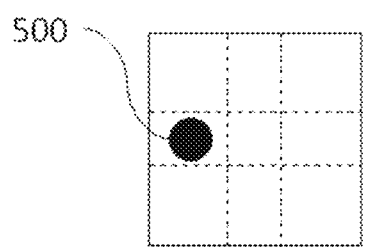
FIG. 5 is a schematic diagram of filling a code point according to a specific implementation mode 1 of the present invention.
Figure 6:
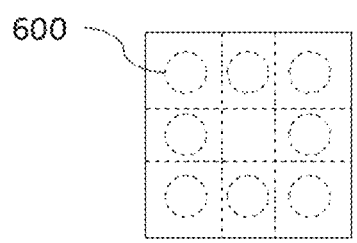
FIG. 6 is a schematic diagram of a sub-block position of a sub-block fillable with a code point according to a specific implementation mode 1 of the present invention.

As shown in FIG. 4, the plurality of coordinate calibration blocks 720, the plurality of data storage blocks 730 and a first indication block 7101 are divided into 3×3 sub-blocks (410-490) by virtual row and column lines respectively, and a central sub-block 450 of each coordinate calibration block 720 is filled with a code point 500; and only one sub-block (410-490) in each of the data storage blocks 730 is filled with code points 500, a middle sub-block 450 of the data storage block 730 is not provided with a code point 500, and the data storage block 730 stores different data by filling code points 500 in different sub-blocks (410-490).

Figure 7:
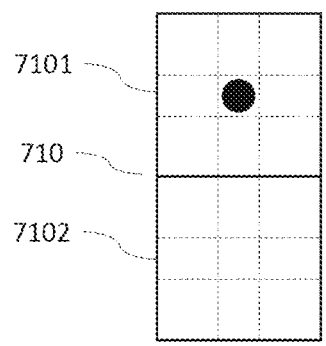
FIG. 7 is a schematic diagram of a direction and coordinate indication set according to a specific implementation mode 1 of the present invention.

As shown in FIG. 7, after the direction and coordinate indication set 710 is rotated by ±90° or 180° around the geometric center of the second indication block 7102, the first indication block 7101 does not overlap with that before rotation.

As shown in FIG. 8, each data storage block 730 of the two-dimensional dot matrix barcode 701 with six rows and six columns may maximally store an octal number, that is, 3 bits, and the maximum storage capacity of 25 data storage blocks 730 is 3*25, that is, 75 bits. A maximum MPR code value in accordance with the national standard GB/T 27937.1-2011 is a decimal number of 9999999999999995 (the last digit is a check digit, calculated according to the first 15 decimal digits), equal to a hexadecimal number 2386F26FC0FFFB, that is, 54 bits long, so a two-dimensional dot matrix barcode 701 of the embodiment may store a complete MPR code, and the remaining 21 bits may store an error correction code for the purpose of data check and error correction.

Figure 9:
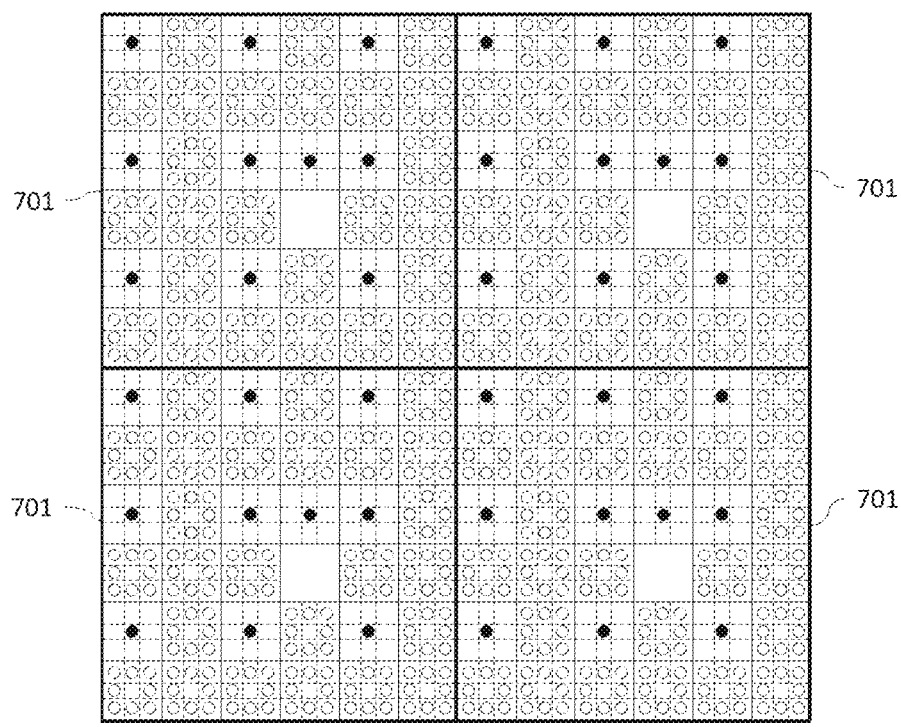
FIG. 9 is a schematic diagram of a tiled splicing barcode including four two-dimensional dot matrix barcodes shown in FIG. 7 according to a specific implementation mode 1 of the present invention.

As shown in FIG. 9, when the two-dimensional dot matrix barcode 701 is tiled and spliced in a row and column manner, all the data storage blocks 730 of the two-dimensional dot matrix barcode 701 in the upper left corner are evenly surrounded by the coordinate calibration block 720. Since each data storage block 730 is always accompanied by a pair of left-right or up-down adjacent coordinate calibration blocks 720, or two pairs of diagonally adjacent coordinate calibration blocks 720, the center coordinates can always be calculated by the adjacent coordinate calibration block 720 in a fast interpolation manner, the difficulty of identification is reduced and identification accuracy is ensured.

The combination of the first indication block 7101 and the second indication block 7102 is used to indicate the coordinate and direction of the two-dimensional dot matrix barcode 701. This combination enables the algorithm to quickly locate the coordinate and direction of the two-dimensional dot matrix barcode, and has the advantages of simple algorithm implementation and small operation burden. In practical application, a code point that appears to be black in a human eye is supplemented by using ink (for example, synthesized by using CMY three-color ink) for reflecting infrared rays in the second indication block 7102, and other code points use infrared absorbing ink (carbon-containing K color ink). When an optical imaging portion of the electronic device 103 uses infrared illumination, the ink dots of the second indication block 7102 become blank blocks because of infrared reflection, so that the image identification is not disturbed. The use of infrared illumination is a common practice for the electronic device 103. A black code point visible to the human eye is synthesized by using the CMY three-color ink in second indication block 7102, and the software only needs to perform simple processing when generating a printed document, so the existing printing process flow is not changed, and the material cost will not be increased. Compared with a comparison technology, the storage capacity, the identification efficiency and the accuracy rate of the embodiment all exceed the comparison technology, and the embodiment has the same human visual perception as the comparison technology.

Embodiment 2

Figure 11:
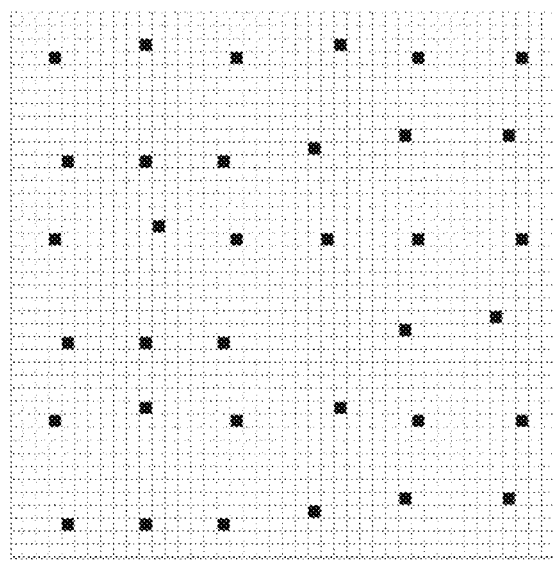
FIG. 11 is a diagram of a two-dimensional dot matrix barcode according to a specific implementation mode 2 of the present invention.

The embodiment is used to identify the two-dimensional dot matrix barcode described above. As shown in FIG. 11, it is an enlarged view of a two-dimensional dot matrix barcode storing 25 octal numbers "01234567012345670123456700". Mesh lines in the figure are only used to assist human eyes in observation. Under 600 DPI printing conditions, a two-dimensional dot matrix barcode of an original size shown in FIG. 11 occupies an area of about 1.778 mm×1.778 mm, a target area readable by an electronic device 103 is usually much larger than the area of a single two-dimensional dot matrix barcode, and a readable target area is filled with the same two-dimensional dot matrix barcode by seamless tiling during printing.

Figure 12:
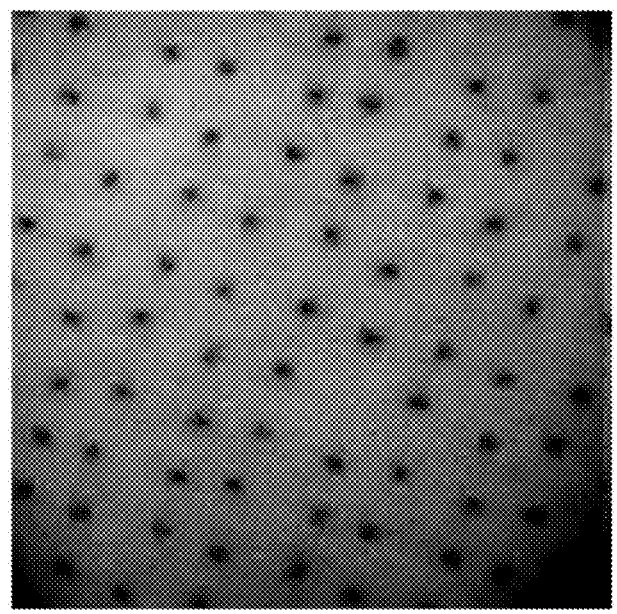
FIG. 12 illustrates a grayscale image according to a specific implementation mode 2 of the present invention.

Decoding flow: as shown in FIG. 12, a grayscale image greater than or equal to a two-dimensional dot matrix barcode is acquired, the grayscale image including at least one direction and coordinate indication set and a plurality of coordinate calibration blocks; an optical electronic imaging system of the electronic device 103 usually acquires an 8-bit grayscale image, and each pixel ranges from 0 to 255; a matrix code included in FIG. 12 is an image formed by the electronic device 103 relative to the two-dimensional dot matrix barcode 102 in a rotated and tilted state; and the center position of FIG. 12 does not overlap with the center position of FIG. 11, and the tilt also causes the grayscale image to have three dark corners.

Figure 10:
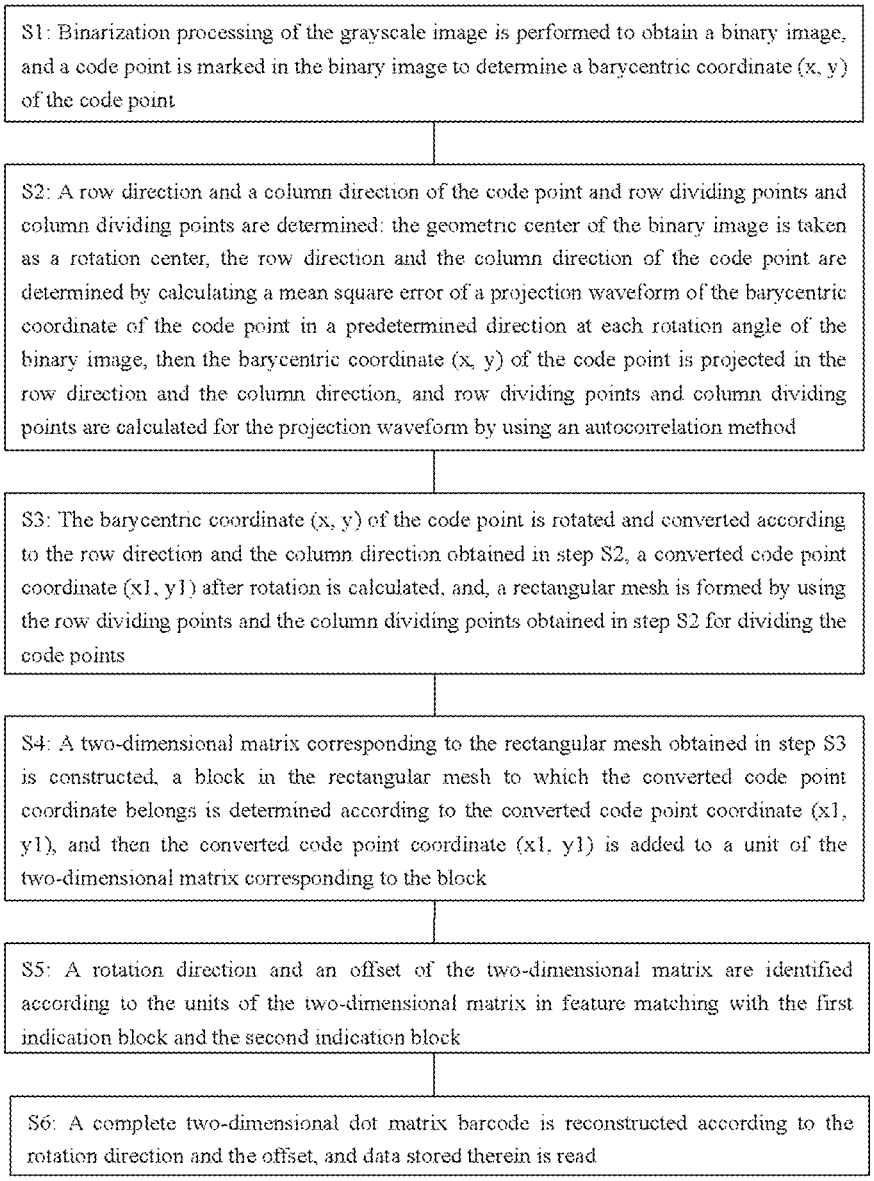
FIG. 10 is a flowchart of a specific implementation mode 2 of the present invention.

As shown in FIG. 10, in the embodiment, the operation of identifying the two-dimensional dot matrix barcode includes the steps as follows.

S1: Binarization processing of the grayscale image is performed to obtain a binary image as shown in FIG. 13, and a code point is marked in the binary image to determine a barycentric coordinate (x, y) of the code point.

Figure 13:
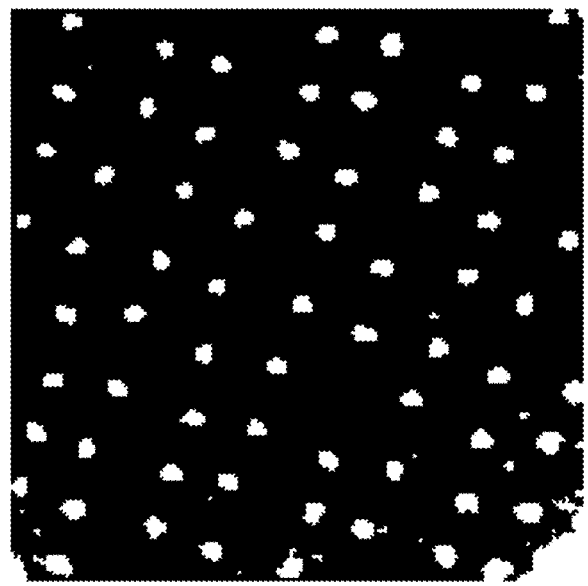
FIG. 13 illustrates a binary image according to a specific implementation mode 2 of the present invention.

As shown in the binary image of FIG. 13, the background is a black pixel, the code point and a noise point are white pixels, the white and connected pixels are marked with the same value, an x-coordinate average value and a y-coordinate average value of the pixels having the same mark value are calculated respectively to obtain the barycentric coordinate (x, y) of each code point, the number of pixels in each code point is counted, and the average number of pixels of all code points is calculated, wherein the code points of which the number of pixels is less than half of the average value or 1.5 times greater than the average value are discarded because they are usually noise points.

S2: A row direction and a column direction of the code point are determined. A row direction and a column direction of the code point 500 are determined by taking the geometric center of the binary image as a rotation center and calculating a mean square error of a projection waveform of the barycentric coordinate of the code point in a predetermined direction at each rotation angle of the binary image, then the barycentric coordinate (x, y) of the code point is projected in the row direction and the column direction respectively, and row dividing points and column dividing points are calculated for the projection waveform by using an autocorrelation method.

Figure 14:
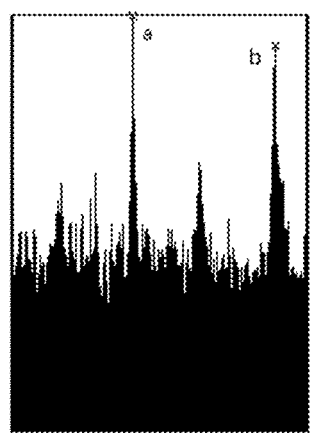
FIG. 14 is a diagram showing a mean square error of a projection waveform according to a specific implementation mode 2 of the present invention.
Figure 15:
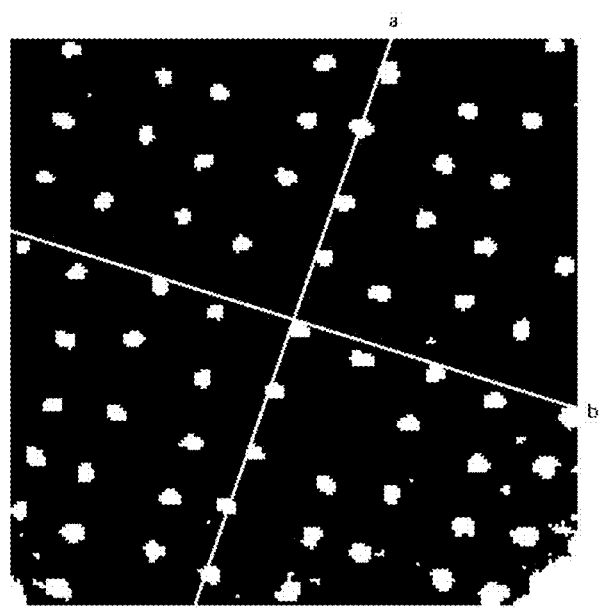
FIG. 15 is a schematic diagram of a row direction and a column direction according to a specific implementation mode 2 of the present invention.

In the embodiment, the operation of determining a row direction and a column direction of the code point 500 is specifically as follows:

Since the coordinates of each code point 500 are offset relative to a reference code point 500 in an array of code points 500 aligned in rows and columns, it can be understood that a two-dimensional fundamental signal of one period is modulated, after modulation, high-frequency harmonics are introduced, but the fundamental frequency of the signal is constant, so the projections of the center of gravity of the code point in the row direction and the column direction parallel to the dot matrix code present the strongest periodicity. Therefore, the row direction and the column direction of the code point 500 may be determined by calculating a mean square error of a projection waveform of the barycentric coordinate of the code point in a certain fixed direction (e.g., a column direction perpendicular to an image) at each rotation angle. As shown in FIG. 14, the horizontal axis indicates the rotation angles of the barycentric coordinate (x, y) of the code point relative to the center point of FIG. 13, the vertical axis indicates mean square errors of projections of the barycentric coordinate of the code point, a rotation angle corresponding to a maximum peak is defined to be representative of the row direction of the two-dimensional dot matrix barcode, and a rotation angle b corresponding to a peak near an offset for 90° is defined to be representative of the column direction of the two-dimensional dot matrix barcode. As shown in FIG. 15, indication lines representative of the row direction and the column direction are drawn on a black and white image. It should be noted that the row direction and the column direction obtained by this step may be rotated by 90° or 180° or 270° compared with the row direction and the column direction of FIG. 11, but the subsequent decoding process is not affected because the rotation may be modified by a direction indication function of the direction and coordinate indication set.

Figure 16A:
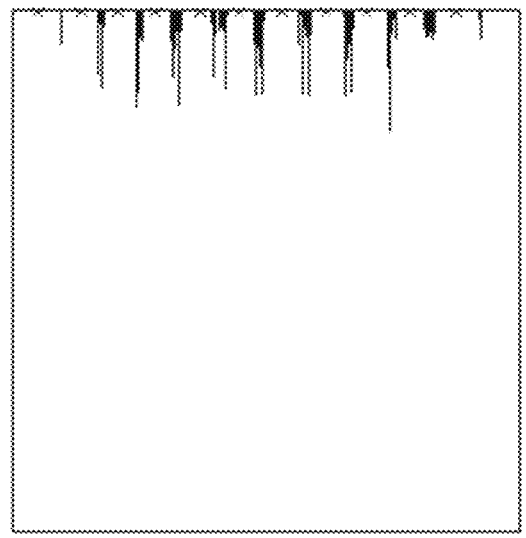
FIG. 16A and FIG. 16B are diagrams of a projection waveform in a row direction and a column direction according to a specific implementation mode 2 of the present invention, respectively.
Figure 16B:
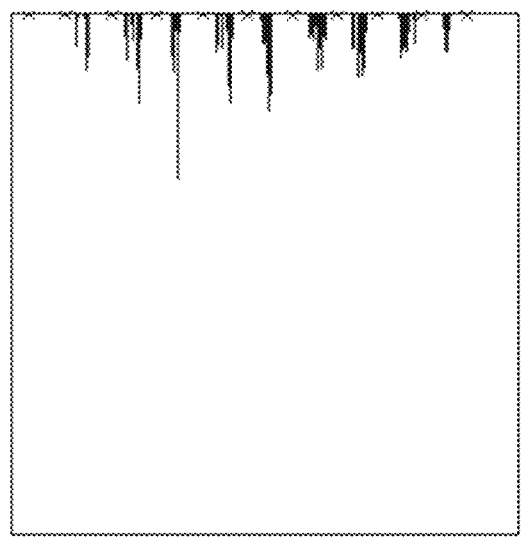

In the embodiment, the barycentric coordinate (x, y) of the code point is respectively projected in the row direction and the column direction, and row dividing points and column dividing points are calculated by using an autocorrelation method for projection results in the row direction and the column direction respectively as follows:

The FIG. 16A and FIG. 16B illustrate projections in the row direction and the column direction respectively. It may be observed visually that projection in the row direction presents the same periodicity as row spacing, and the projection in the column direction presents the same periodicity as column spacing. The autocorrelation algorithm is used to determine respective periods Tr and Tc for the two projections respectively, Tr is the row spacing, and Tc is the column spacing. The maximum value of a projection in the row direction is used as a reference, and the row dividing points are generated by taking Tr as a step length. The maximum value of a projection in the column direction is used as a reference, and the column dividing points are generated by taking Tc as a step length. In FIG. 16A and FIG. 16B, the part marked with "x" in the horizontal axis is a division point.

S3: The barycentric coordinate (x, y) of the code point is rotated and converted according to the row direction and the column direction obtained in step S2, a converted code point coordinate $(x_1, y_1)$ after rotation is calculated, and a rectangular mesh is formed by using the row dividing points and the column dividing points obtained in step S2 for dividing the code points 500.

In the embodiment, the operation of rotating and converting the barycentric coordinate (x, y) of the code point obtained in step S1 according to the row direction and the column direction obtained in step S2, calculating a converted code point coordinate $(x_1, y_1)$ after rotation according to the barycentric coordinate (x, y) of the code point, and forming, by using the row dividing points and the column dividing points obtained in step S2, a rectangular mesh for dividing the code points 500 is specifically as follows:

The barycentric coordinate of the code point is converted, a coordinate transformation formula being:

$$x_1 = x^*\cos(\alpha) - y^*\sin(\alpha);$$

$$y_1 = x^*\cos(\beta) - y^*\sin(\beta);$$

α is a rotation angle of a dot matrix code in a row direction in FIG. 13, β is a rotation angle of the dot matrix code in a column direction in FIG. 13, and an origin of rotation is the center of FIG. 15.

Figure 17:
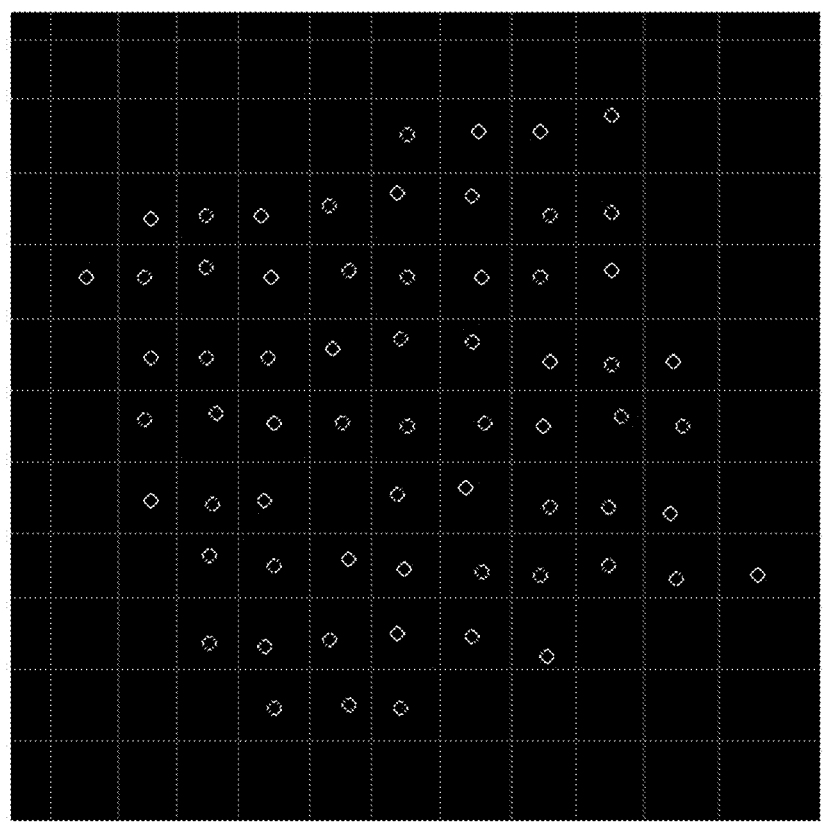
FIG. 17 is a schematic diagram of a result after a rotation operation according to a specific implementation mode 2 of the present invention.

FIG. 17 is a schematic diagram of a result after a rotation operation. The center of each circle in the figure corresponds to a barycentric coordinate of a code point, and mesh lines in the figure are drawn according to the row dividing points and column dividing points calculated in step S2, wherein the mesh lines in a vertical direction are drawn according to the row dividing points, and the mesh lines in a horizontal direction are drawn according to the column dividing point. It can be seen intuitively from FIG. 17 that each code point 500 falls in a rectangular block mesh, and an empty mesh with upper, lower, left and right sides all surrounded by a non-empty mesh, namely the seventh row and the fifth column (the upper left corner is defined as Row 0 and Column 0), corresponds to the second indication block. It should be noted that parallel lines constituting the mesh lines are not accurately and evenly distributed, which does not affect the subsequent decoding process, because the offset of the data code point 500 is calculated subsequently with reference to the code point coordinates in the coordinate calibration block, instead of the mesh lines.

S4: A two-dimensional matrix corresponding to the rectangular mesh obtained in step S3 is constructed, a block in the rectangular mesh to which the converted code point coordinate $(x_1, y_1)$ belongs is determined according to the converted code point coordinate $(x_1, y_1)$, and then it is added into a unit of the two-dimensional matrix corresponding to the block.

In the embodiment, a two-dimensional matrix R corresponding to the rectangular mesh formed by dividing the code point 500 in step S3 is constructed, each unit of the two-dimensional matrix R corresponds to a rectangular block in FIG. 17, and the subsequent decoding processes are all performed on the basis of the two-dimensional matrix R. It should be noted that the unit of the two-dimensional matrix R may store the coordinates of one code point 500 at most.

S5: A rotation direction and an offset of the two-dimensional matrix are identified according to the unit of the two-dimensional matrix in feature matching with the first indication block and the second indication block.

Figure 18:
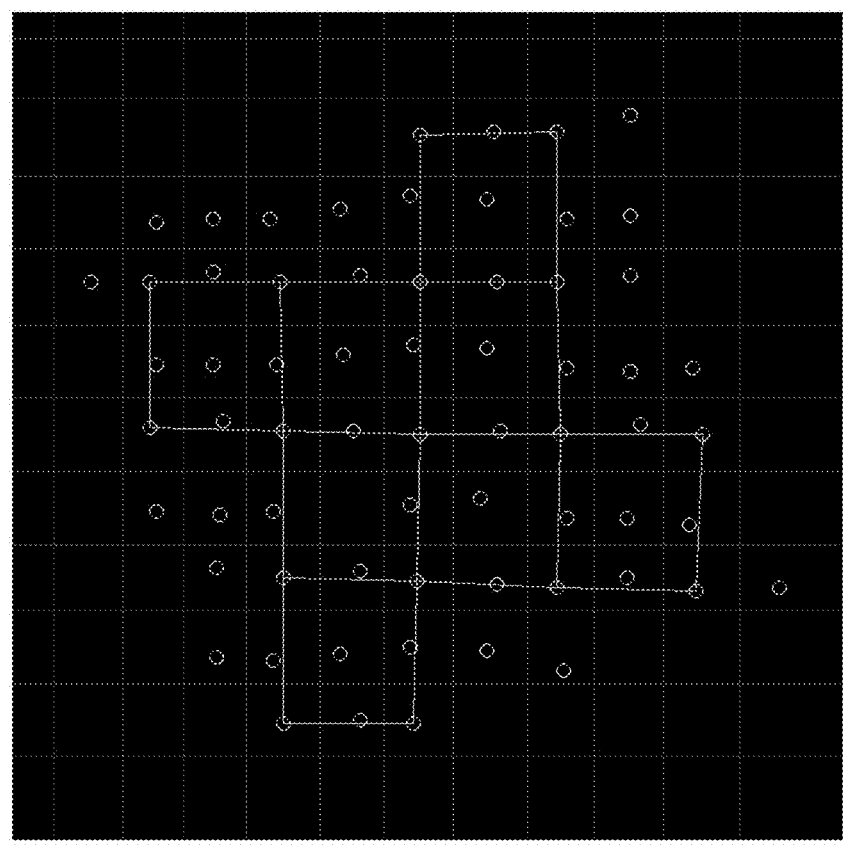
FIG. 18 is a schematic diagram showing a connection of code points in adjacent coordinate calibration blocks according to a specific implementation mode 2 of the present invention.

An empty unit with upper, lower, left and right sides surrounded by a non-empty unit is found in the two-dimensional matrix R, the empty unit corresponds to the second indication block, and all coordinate calibration blocks may be determined according to a relative position relationship between the coordinate calibration block and the second indication block. In general, in order to ensure reliable identification, the area of an image capturing port of the electronic device 103 is ensured to cover more than one two-dimensional dot matrix barcode of FIG. 11, the code points 500 included in each frame of digital image captured by the corresponding electronic device 103 may reconstruct a complete dot matrix code of FIG. 11, and the constructed two-dimensional matrix R includes at least one direction and coordinate indication set. The effect of connecting code points in adjacent coordinate calibration blocks is shown in FIG. 18, it can be intuitively seen that the code points in the coordinate calibration block form an approximately square mesh, and therefore, they can make good use of the function of coordinate calibration.

A two-dimensional matrix R' corresponding to the two-dimensional matrix R is constructed to store data corresponding to the rectangular block, a value corresponding to the rectangular block (also the first indication block to be searched in the subsequent step) of which the code point is in the center is defined as 8, a value corresponding to the second indication block is defined as 9, the center coordinate of the data storage block is calculated according to the converted code point coordinate $(x_1, y_1)$ of the coordinate calibration block by an interpolation algorithm, the stored data is read according to an offset distance of the code point in the data storage block relative to the center coordinate, and the data is stored into the two-dimensional matrix R'.

Figure 19:
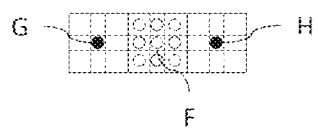
FIG. 19 is a first schematic diagram of determining a center coordinate of a data storage block according to a specific implementation mode 2 of the present invention.

First, it is judged whether coordinate calibration code points adjacent in left and right exist. As shown in FIG. 19, if G and H exist, the center coordinate of the data storage block is F=(G+H)/2.

Figure 20:
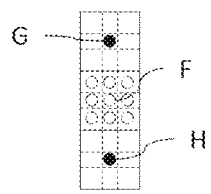
FIG. 20 is a second schematic diagram of determining a center coordinate of a data storage block according to a specific implementation mode 2 of the present invention.

Otherwise, it is judged whether coordinate calibration code points adjacent in up and down exist. As shown in FIG. 20, if G and H exist, the center coordinate of the data storage block is F=(G+H)/2.

Figure 21:
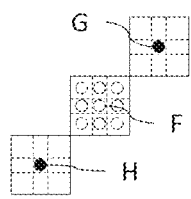
FIG. 21 is a third schematic diagram of determining a center coordinate of a data storage block according to a specific implementation mode 2 of the present invention.

Otherwise, it is judged whether coordinate calibration code points adjacent in lower left and upper right exist. As shown in FIG. 21, if G and H exist, the center coordinate of the data storage block is F=(G+H)/2.

Figure 22:
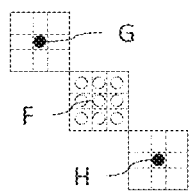
FIG. 22 is a fourth schematic diagram of determining a center coordinate of a data storage block according to a specific implementation mode 2 of the present invention.

Otherwise, it is judged whether coordinate calibration code points adjacent in upper right and lower left exist. As shown in FIG. 22, if G and H exist, the center coordinate of the data storage block is F=(G+H)/2.

Figure 23:
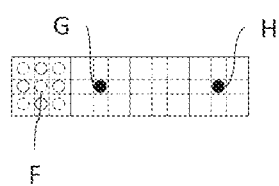
FIG. 23 is a fifth schematic diagram of determining a center coordinate of a data storage block according to a specific implementation mode 2 of the present invention.

Otherwise, it is judged whether two coordinate calibration code points most adjacent on the left side of the same row exist. As shown in FIG. 23, if G and H exist, the center coordinate of the data storage block is F=G+(G−H)/2.

Figure 24:
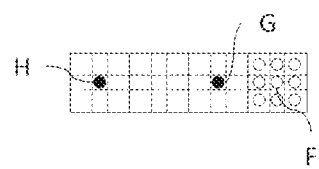
FIG. 24 is a sixth schematic diagram of determining a center coordinate of a data storage block according to a specific implementation mode 2 of the present invention.

Otherwise, it is judged whether two coordinate calibration code points most adjacent on the right side of the same row exist. As shown in FIG. 24, if G and H exist, the center coordinate of the data storage block is F=G+(G−H)/2.

Figure 25:
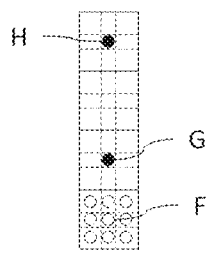
FIG. 25 is a seventh schematic diagram of determining a center coordinate of a data storage block according to a specific implementation mode 2 of the present invention.

Otherwise, it is judged whether two coordinate calibration code points most adjacent on the upper side of the same row exist. As shown in FIG. 25, if G and H exist, the center coordinate of the data storage block is F=G+(G−H)/2.

Figure 26:
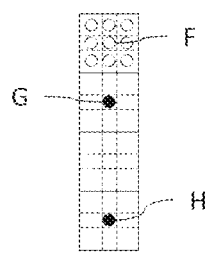
FIG. 26 is an eighth schematic diagram of determining a center coordinate of a data storage block according to a specific implementation mode 2 of the present invention.

Otherwise, it is judged whether two coordinate calibration code points most adjacent on the lower side of the same row exist. As shown in FIG. 26, if G and H exist, the center coordinate of the data storage block is F=G+(G−H)/2.

Figure 27:
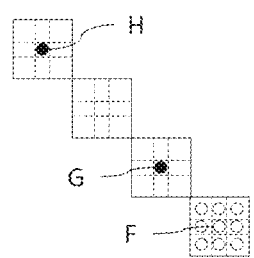
FIG. 27 is a ninth schematic diagram of determining a center coordinate of a data storage block according to a specific implementation mode 2 of the present invention.

Otherwise, it is judged whether two coordinate calibration code points most adjacent diagonally in upper right exist. As shown in FIG. 27, if G and H exist, the center coordinate of the data storage block is F=G+(G−H)/2.

Figure 28:
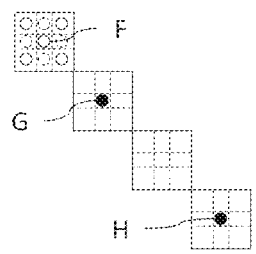
FIG. 28 is a tenth schematic diagram of determining a center coordinate of a data storage block according to a specific implementation mode 2 of the present invention.

Otherwise, it is judged whether two coordinate calibration code points most adjacent diagonally in lower right exist. As shown in FIG. 28, if G and H exist, the center coordinate of the data storage block is F=G+(G−H)/2.

Figure 29:
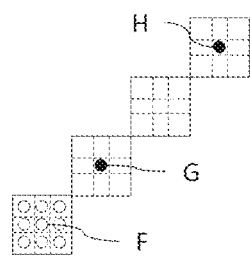
FIG. 29 is an eleventh schematic diagram of determining a center coordinate of a data storage block according to a specific implementation mode 2 of the present invention.

Otherwise, it is judged whether two coordinate calibration code points most adjacent diagonally in upper left exist. As shown in FIG. 29, if G and H exist, the center coordinate of the data storage block is F=G+(G−H)/2.

Figure 30:
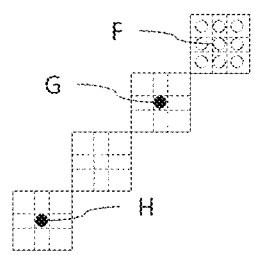
FIG. 30 is a twelfth schematic diagram of determining a center coordinate of a data storage block according to a specific implementation mode 2 of the present invention.

Otherwise, it is judged whether two coordinate calibration code points most adjacent diagonally in lower left exist. As shown in FIG. 30, if G and H exist, the center coordinate of the data storage block is F=G+(G−H)/2.

If none of the above conditions are met, the code point 500 is discarded.

Figure 31:
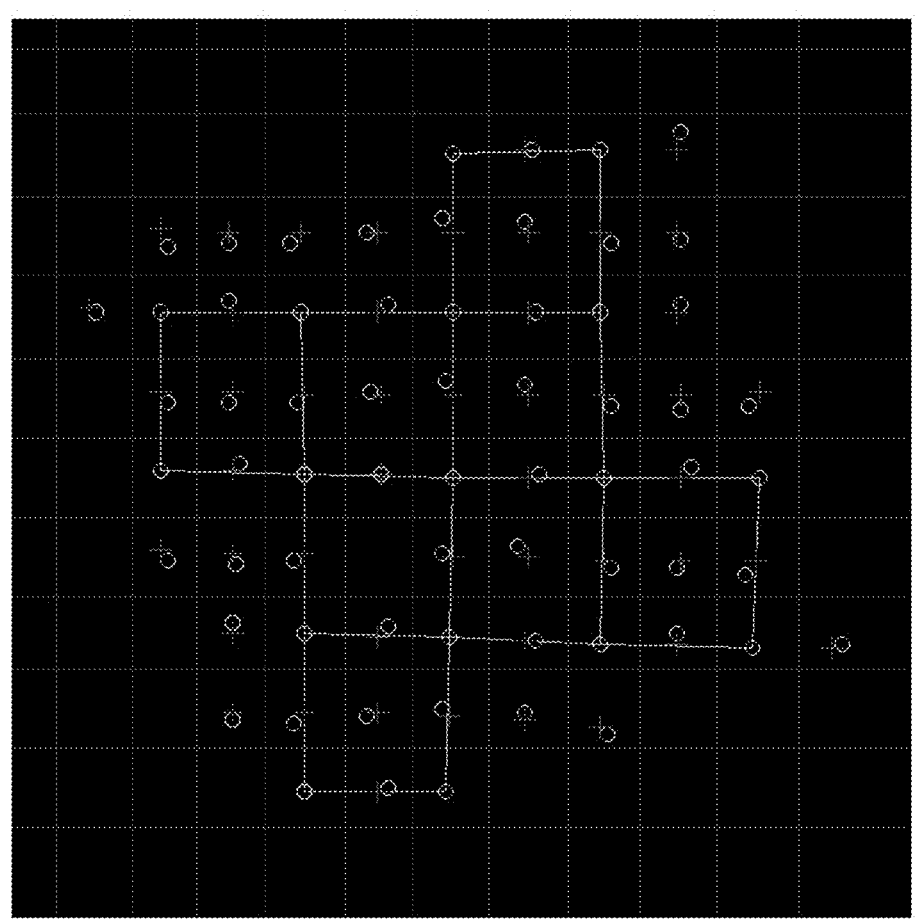
FIG. 31 is a schematic diagram of a center coordinate of a data storage block according to a specific implementation mode 2 of the present invention.

In FIG. 31, each "cross" symbol is drawn according to the center coordinate of the data storage block calculated by the above interpolation method, and the offset mode of the data code point relative to the center coordinate of the data storage block can be visually seen from this figure.

For each data code point I $(x_i, y_i)$ in FIG. 31, an offset reference point is defined as F $(x_f, y_f)$, that is, a center point of a "+" sign in FIG. 31; assuming that the tolerated maximum error of the coordinate calculation is e, a normalized horizontal offset is calculated as HS=INT $((x_i-x_f)/e)$, where INT is a rounding operation; if HS<−1, HS=−1; if HS>1, HS=1; a normalized vertical offset is calculated as VS=INT $((y_i-y_f)/e)$; if VS<−1, VS=−1; and if VS>1, VS=1. Thus, there are nine combinations of values of (HS, VS), the first combination (0, 0) corresponds to the value 8 for indicating the first indication block, and the correspondence between the remaining eight combinations and the octal numbers 0 to 7 is as listed in Table 1.

TABLE 1

| Offset mode (HS, VS) | Octal number |
| --- | --- |
| (0, −1) | 0 |
| (+1, −1) | 1 |
| (+1, 0) | 2 |
| (+1, +1) | 3 |
| (0, +1) | 4 |
| (−1, +1) | 5 |
| (−1, 0) | 6 |
| (−1, −1) | 7 |

A value corresponding to the second indication block is defined as 9. It should be noted that if the code point matrix in FIG. 31 is rotated with respect to FIG. 11, it is necessary to modify the octal number in the above table according to the rotation direction.

A unit A2 having the value of 9 is searched in a two-dimensional matrix R', and then a unit A1 having the value of 8 is searched in the upper, lower, left and right parts adjacent to A2. The rotation direction of a two-dimensional matrix R1 may be determined according to the relative direction of A2 and A1, as listed in Table 2.

TABLE 2

| Direction of A2 with respect to A1 | Rotation angle |
| --- | --- |
| Up | 0° |
| Right | 90° |
| Down | 180° |
| Left | 270° |

S6: A complete two-dimensional dot matrix barcode is reconstructed according to the rotation direction and the offset, and data stored therein are read.

Figure 32:
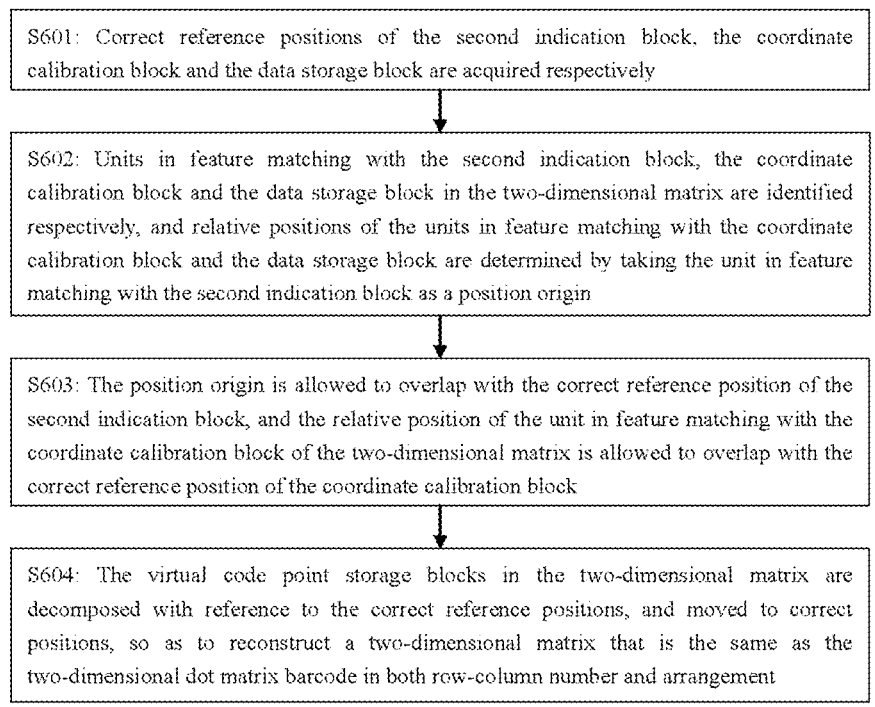
FIG. 32 is a flowchart of a specific implementation mode 2 of the present invention.
Figure 33:
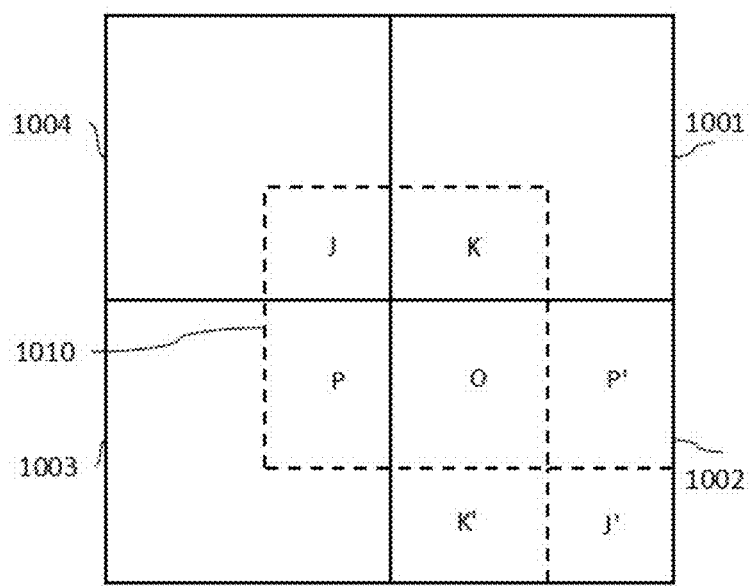
FIG. 33 is a reconstructing schematic diagram of a specific implementation mode 2 of the present invention.

In the embodiment, as shown in FIG. 32, the operation of reconstructing a complete two-dimensional dot matrix barcode includes the sub-steps as follows.

S601: Correct reference positions of the second indication block, the coordinate calibration blocks and the data storage blocks are acquired respectively.

S602: Units in feature matching with the second indication block, the coordinate calibration blocks and the data storage blocks in the two-dimensional matrix are identified respectively, and relative positions of the units in feature matching with the coordinate calibration blocks and the data storage blocks are determined by taking the unit in feature matching with the second indication block as a position origin.

S603: The position origin is allowed to overlap with the correct reference position of the second indication block, and the relative position of the unit in feature matching with the coordinate calibration block of the two-dimensional matrix is allowed to overlap with the correct reference position of the coordinate calibration block.

S604: The virtual code point storage blocks in the two-dimensional matrix are decomposed with reference to the correct reference positions, and moved to correct positions, so as to reconstruct a two-dimensional matrix that is the same as the two-dimensional dot matrix barcode in both row-column number and arrangement.

As shown in FIG. 31, it does not directly contain a complete two-dimensional dot matrix barcode, but a complete two-dimensional dot matrix barcode may be reconstructed with all of its code points 500. To visually illustrate the reconstruction method, please see FIG. 33. As shown in FIG. 33, 1001, 1002, 1003, and 1004 each represent a complete two-dimensional dot matrix barcode having the same content, and they are seamlessly spliced. The area 1010 is an effective image acquisition area of the electronic device 103, although the area 1010 does not completely cover any one of the two-dimensional dot matrix barcodes 1001 to 1004, it can be seen intuitively from the figure that if a block J is moved to J', a block K is moved to K' and a block P is moved to P', the four blocks O, K', J', and P' reconstruct a complete block 1002.

It should be noted that a check or forward error correction algorithm may be performed on original data to generate check data before the two-dimensional dot matrix barcode is generated, and the check data is stored together to the two-dimensional dot matrix barcode. If the data stored in 1001 to 1004 are different, the reconstructed dot matrix code will not be an effective dot matrix code, and the electronic device 103 will refuse to make identification because the data check fails. This occurs when the electronic device 103 reads a joint between the two readable target areas. The area of the joints of different targets occupies a small proportion of the area of the entire readable area, and the probability of reading in actual operation is low, so it does not affect the user's use. It should be noted that the embodiment does not use the forward error correction algorithm to generate the check data, but selects 25 octal numbers "01234567012345670123 45670" as the storage content of the dot matrix code for the purpose of convenient reading.

A 6×6 two-dimensional matrix FR for storing a target result is constructed, and the value stored in the code point of the $U^{th}$ row and the $V^{th}$ column in FIG. 31 is filled into the $W^{th}$ row and the $Z^{th}$ column in the two-dimensional matrix FR, an operation relationship between (W, Z) and (U, V) being as follows:

If FIG. 31 is not rotated with respect to FIG. 11,
W=(V-origin_col+18) mod 6;
Z=(U-origin_row+18) mod 6.
If FIG. 31 is rotated by 90° with respect to FIG. 11,
W=(U-origin_row+18) mod 6;
Z=(6-(V-origin_col)+18) mod 6.
If FIG. 31 is rotated by 180° with respect to FIG. 11,
W=(6-(V-origin_col)+18) mod 6;
Z=(6-(U-origin_row)+18) mod 6.
If FIG. 31 is rotated by 270° with respect to FIG. 11,
W=(6-(V-origin_row)+18) mod 6;
Z=(V-origin_col+18) mod 6.

In the above four groups of formulas, mod is the modulo operation, +18 ensures that the number of modulo is a positive number, and (origin_row, origin_col) is origin row and column coordinates of the two-dimensional dot matrix barcode, that is, the row and column coordinates of the second indication block are reduced by 3 respectively. In FIG. 31, the first indication block is located in the seventh row and the fifth column (the first rectangular block at the upper left corner is defined as Row 0 and Column 0), and the rotation angle of FIG. 31 with respect to FIG. 4 is 0, so origin_row=5, and origin_col=6. It should be noted that there is a possibility that a plurality of rectangular blocks in FIG. 31 correspond to the same unit in the FR, and the solution is to retain the most reliable code point. Since the center coordinates of the data storage block are calculated according to the coordinate interpolation of adjacent coordinate calibration code points, different interpolation manners have different degrees of credibility due to different relative positions of the data storage blocks and the coordinate calibration blocks. The credibility is defined as follows:

The credibility scores 15 according to an interpolation manner in FIG. 19 or FIG. 20.
The credibility scores 10 according to an interpolation manner in FIG. 21 or FIG. 22.
The credibility scores 7 according to any one of interpolation manners in FIG. 23 to FIG. 26.
The credibility scores 5 according to any one of interpolation manners in FIG. 27 to FIG. 30.

TABLE 3

| | | | | | |
|---|---|---|---|---|---|
| ff | f0 | ff | f1 | ff | f2 |
| f3 | f4 | f5 | f6 | f7 | f0 |
| ff | f1 | ff | f8 | ff | f2 |
| f3 | f4 | f5 | f9 | f6 | f7 |
| ff | f0 | ff | f1 | ff | f2 |
| f3 | 54 | f5 | f6 | f7 | f0 |

Table 3 is the FR matrix obtained according to the above method, each unit is an 8-bit hexadecimal number, the low 4-bit value is the value stored in the data storage block, and the high 4-bit value is the credibility. In particular, the value ff corresponds to the coordinate calibration blocks in the dot matrix code, f8 corresponds to the first indication block, and f9 corresponds to the second indication block. So far, complete decoding restores the data stored in FIG. 4, that is, 25 sets of octal numbers "01234567012345670123 45670".

Those skilled in the art will recognize that it is possible to make many variations to the above description, and all embodiments are merely used to describe one or more specific implementation modes.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A two-dimensional dot matrix barcode encoding method, wherein a two-dimensional dot matrix barcode is composed of M×N virtual code point storage blocks, and a plurality of coordinate calibration blocks, a plurality of data storage blocks, a first indication block and a second indication block are formed respectively by filling code points into the virtual code point storage blocks, wherein
    code points filled in the plurality of coordinate calibration blocks are located in the center of the virtual code point storage block;
    a code point filled in the first indication block is located in the center thereof, and the second indication block is not filled with a code point or is filled, in the center thereof, with an ink code point capable of reflecting a light having a specific wavelength;
    a direction and coordinate indication set indicative of a direction and a coordinate is formed by means of a combination of the first indication block and the second indication block;
    the plurality of coordinate calibration blocks are separated from each other and distributed among the two-dimensional dot matrix barcode;
    code points filled in the plurality of data storage blocks are used to store data information, and the code points filled in the plurality of data storage blocks are disposed away from the center of the virtual code point storage block; and
    the plurality of coordinate calibration blocks and the plurality of data storage blocks have only one code point, where M≥4, N≥4, and M and N are both even numbers.

2. The two-dimensional dot matrix barcode encoding method of claim 1, wherein in the two-dimensional dot matrix barcode, the virtual code point storage blocks in which row coordinates and column coordinates are both odd or even are coordinate calibration blocks, and the remaining virtual code point storage blocks are the first indication block, the second indication block and the data storage blocks.

3. The two-dimensional dot matrix barcode encoding method of claim 1, wherein the plurality of coordinate calibration blocks, the plurality of data storage blocks, a first indication block and a second indication block are divided into 3×3 sub-blocks by virtual row and column lines respectively, and a central sub-block of each coordinate calibration block is filled with a code point; a central sub-block of the first indication block is filled with a code point; the second indication block is not filled with a code point or a central sub-block is filled with an ink code point capable of reflecting a light having a specific wavelength; and only one sub-block in each of the data storage blocks is filled with code points, a middle sub-block of the data storage block is not provided with a code point, and the data storage block stores different data by filling code points in different sub-blocks.

4. The two-dimensional dot matrix barcode encoding method of claim 1, wherein after the direction and coordinate indication set is rotated by ±90° or 180° around the geometric center of the second indication block, the first indication block does not overlap with that before rotation.

5. A two-dimensional dot matrix barcode identifying method, used for identifying a two-dimensional dot matrix barcode obtained by the two-dimensional dot matrix barcode encoding method according to any one of claim 1, the two-dimensional dot matrix barcode reading method comprising the following steps:

acquiring a code map grayscale image not smaller than the size of a two-dimensional dot matrix barcode, the grayscale image comprising at least one direction and coordinate indication set and a plurality of coordinate calibration blocks;

acquiring row and column positions of the coordinate calibration blocks and the direction and coordinate indication set in the two-dimensional dot matrix barcode according to the grayscale image comprising the at least one direction and coordinate indication set and the plurality of coordinate calibration blocks; and reading data stored in the two-dimensional dot matrix barcode according to the grayscale image and the row and column positions of the coordinate calibration blocks and the direction and coordinate indication set.

6. The two-dimensional dot matrix barcode identifying method of claim 5, wherein reading data stored in the two-dimensional dot matrix barcode comprises the following steps:

S1: performing binarization processing on the grayscale image to obtain a binary image, and marking a code point in the binary image to determine a barycentric coordinate (x, y) of the code point;

S2: determining a row direction and a column direction of the code point and a row dividing point and a column dividing point: determining a row direction and a column direction of the code point by taking the geometric center of the binary image as a rotation center and calculating a mean square error of a projection waveform of the barycentric coordinate of the code point in a predetermined direction at each rotation angle of the binary image, then projecting the barycentric coordinate (x, y) of the code point in the row direction and the column direction, and calculating row dividing points and the column dividing points for the projection waveform by using an autocorrelation method;

S3: rotating and converting the barycentric coordinate (x, y) of the code point according to the row direction and the column direction obtained in step S2, calculating a converted code point coordinate (x1, y1) after rotation, and forming, by using the row dividing point and the column dividing points obtained in step S2, a rectangular mesh for dividing the code point;

S4: constructing a two-dimensional matrix corresponding to the rectangular mesh obtained in step S3, determining, according to the converted code point coordinate (x1, y1), a block in the rectangular mesh to which converted code point coordinate belongs, and then adding the converted code point coordinate (x1, y1) to a unit of the two-dimensional matrix corresponding to the block;

S5: identifying a rotation direction and an offset of the two-dimensional matrix according to the unit of the two-dimensional matrix in feature matching with the first indication block and the second indication block; and S6: reconstructing a complete two-dimensional dot matrix barcode according to the rotation direction and the offset, and reading data stored therein.

7. The two-dimensional dot matrix barcode identifying method of claim 6, wherein the rotation direction of the two-dimensional matrix is obtained according to a relative position between the first indication block and the second indication block.

8. The two-dimensional dot matrix barcode identifying method of claim 6, wherein the step of reading values stored in the data storage block according to the coordinate calibration block specifically comprises: first, calculating a center coordinate of the data storage block according to a converted code point coordinate $(x_1, y_1)$ of the coordinate calibration block; and then, reading the stored data according to an offset of the converted code point coordinate $(x_1, y_1)$ of the code point stored in the data storage block relative to the center coordinate.

9. The two-dimensional dot matrix barcode identifying method of claim 8, wherein the center coordinate of the data storage block is calculated by using an interpolation method according to the converted code point coordinate $(x_1, y_1)$ of the coordinate calibration block.

10. The two-dimensional dot matrix barcode identifying method of claim 6, wherein the step of reconstructing a complete two-dimensional dot matrix barcode comprises the following sub-steps:

S601: acquiring correct reference positions of the second indication block, the coordinate calibration block and the data storage block respectively;

S602: identifying units in feature matching with the second indication block, the coordinate calibration block and the data storage block in the two-dimensional matrix respectively, and determining relative positions of the units in feature matching with the coordinate calibration block and the data storage block by taking the unit in feature matching with the second indication block as a position origin;

S603: allowing the position origin to overlap with the correct reference position of the second indication block, and allowing the relative position of the unit in feature matching with the coordinate calibration block of the two-dimensional matrix to overlap with the correct reference position of the coordinate calibration block; and S604: decomposing the virtual code point storage blocks in the two-dimensional matrix with reference to the correct reference positions, and moving them to correct positions, so as to reconstruct a two-dimensional matrix that is the same as the two-dimensional dot matrix barcode in both row-column number and arrangement.

* * * * *